United States Patent
Mendonsa et al.

(10) Patent No.: US 9,373,355 B1
(45) Date of Patent: Jun. 21, 2016

(54) COMPENSATING FOR INTERFERENCE VIA A MULTI-READER SYSTEM

(71) Applicant: Seagate Technology LLC, Cupertino, CA (US)

(72) Inventors: Riyan Alex Mendonsa, Edina, MN (US); Puskal P Pokharel, Bloomington, MN (US); Timothy F Ellis, Tonka Bay, MN (US)

(73) Assignee: Seagate Technology LLC, Cupertion, CA (US)

( * ) Notice: Subject to any disclaimer, the term of this patent is extended or adjusted under 35 U.S.C. 154(b) by 0 days.

(21) Appl. No.: 14/611,122

(22) Filed: Jan. 30, 2015

(51) Int. Cl.
*G11B 5/58* (2006.01)
*G11B 5/584* (2006.01)
*G11B 20/10* (2006.01)

(52) U.S. Cl.
CPC .................................. *G11B 20/10046* (2013.01)

(58) Field of Classification Search
CPC .... G11B 20/10009; G11B 5/09; G11B 5/012; G11B 27/36; G11B 5/58; G11B 5/584; G11B 5/488; G11B 15/4678; G11B 5/588
USPC ........ 360/39, 25, 53, 77.02, 75, 73.12, 77.06, 360/77.14, 77.01
See application file for complete search history.

(56) References Cited

U.S. PATENT DOCUMENTS

| | | | |
|---|---|---|---|
| 4,170,033 A | 10/1979 | Ridgway | |
| 4,291,343 A * | 9/1981 | Riddle, Jr. | 360/30 |
| 4,656,546 A | 4/1987 | Mallory | |
| 4,972,396 A | 11/1990 | Rafner | |
| 5,420,734 A | 5/1995 | Colineau | |
| 5,523,898 A | 6/1996 | Jove | |
| 5,579,189 A | 11/1996 | Morehouse | |
| 5,682,360 A * | 10/1997 | Oshima | 369/13.2 |
| 6,002,554 A | 12/1999 | Schmalhorst | |
| 6,021,024 A | 2/2000 | Akiyama | |
| 6,504,675 B1 | 1/2003 | Skukh | |
| 6,583,946 B1 | 6/2003 | Emerson | |
| 6,717,780 B2 | 4/2004 | Hiramoto | |
| 6,771,441 B2 | 8/2004 | Tang | |
| 6,882,488 B1 | 4/2005 | Albrecht | |
| 6,954,340 B2 | 10/2005 | Shukh | |
| 7,072,147 B2 | 7/2006 | Limmer | |
| 7,092,186 B1 | 8/2006 | Hogg | |
| 7,126,773 B1 | 10/2006 | Taratorin | |
| 7,126,890 B2 | 10/2006 | Learned | |
| 7,133,233 B1 | 11/2006 | Ray | |

(Continued)

OTHER PUBLICATIONS

Vikramaditya, Read Read-Only Fields While Writing, U.S. Appl. No. 14/050,447, filed Oct. 10, 2013, Seagate Technology LLC, US.
Vikramaditya, Non-Final Office Action, Mailing Date: Feb. 27, 2014, Read Read-Only Fields While Writing, U.S. Appl. No. 14/050,447, filed Oct. 10, 2013, Seagate Technology LLC, US.

(Continued)

*Primary Examiner* — Nabil Hindi
(74) *Attorney, Agent, or Firm* — Cesari & Reed, LLP; Kirk A. Cesari (57) ABSTRACT

The disclosure is related to systems and methods of compensating for interference via a multi-reader system. A transducer or read/write head may include a write element and multiple read elements. A compensation circuit can be configured to process read signals from the multiple read elements to reduce noise within the read signals, such as caused by the writer being simultaneously active or for other reasons. The read signals may be combined to produce a compensated read signal that has less noise than the original read signals.

20 Claims, 10 Drawing Sheets

(56) References Cited

U.S. PATENT DOCUMENTS

| | | |
|---|---|---|
| 7,251,878 B2 | 8/2007 | Le |
| 7,253,992 B2 | 8/2007 | Chen |
| 7,265,941 B2 | 9/2007 | Le |
| 7,342,748 B2 | 3/2008 | Yip |
| 7,352,526 B2 | 4/2008 | Takaishi |
| 7,429,857 B2 | 9/2008 | Guzik |
| 7,430,095 B2 | 9/2008 | Benakli |
| 7,436,621 B2 | 10/2008 | Goker |
| 7,436,632 B2 | 10/2008 | Li |
| 7,472,469 B2 | 1/2009 | Heim |
| 7,551,393 B2 | 6/2009 | Biskeborn |
| 7,751,148 B1 | 7/2010 | Alstrin |
| 7,880,999 B2 | 2/2011 | Benakli |
| 7,889,454 B2 | 2/2011 | Johnson |
| 7,916,432 B2 | 3/2011 | Ohta |
| 8,035,910 B2 | 10/2011 | Mallary |
| 8,130,473 B2 | 3/2012 | Hachisuka |
| 8,208,228 B2 | 6/2012 | Maat |
| 8,213,103 B2 * | 7/2012 | Grobis et al. .................. 360/51 |
| 8,576,506 B1 | 11/2013 | Wang |
| 8,913,341 B1 * | 12/2014 | Jury et al. ....................... 360/75 |
| 2002/0131213 A1 | 9/2002 | Tsuchiya |
| 2004/0021982 A1 | 2/2004 | Ozue |
| 2007/0201160 A1 | 8/2007 | Albrecht |
| 2007/0230003 A1 | 10/2007 | Barnes |
| 2008/0013199 A1 | 1/2008 | Kumar |
| 2009/0002896 A1 | 1/2009 | Mallary |
| 2009/0284874 A1 | 11/2009 | Yin |
| 2010/0020435 A1 | 1/2010 | Chen |
| 2010/0110575 A1 | 5/2010 | Gao |
| 2012/0206830 A1 | 8/2012 | Gao |
| 2013/0286511 A1 | 10/2013 | Edelman |
| 2014/0177102 A1 | 6/2014 | Kief |

OTHER PUBLICATIONS

Vikramaditya, Final Office Action, Mailing Date: Oct. 24, 2014, Read Read-Only Fields While Writing, U.S. Appl. No. 14/050,447, filed Oct. 10, 2013, Seagate Technology LLC, US.

Meloche, Eric, "Perpendicular Recording at High Areal Densities," Seagate, Feb. 14, 2008, 41 pages. http://www.docstoc.com/docs/107142369/Perpendicular-Recording-at-High-Areal-Densities.

Kief, Restriction Requirement, Mailing Date: Jun. 4, 2013, Multi-Reader Method and Apparatus, U.S. Appl. No. 13/723,870, filed Dec. 21, 2012, Seagate Technology LLC, US.

Kief, Non-Final Office Action, Mailing Date: Sep. 6, 2013, Multi-Reader Method and Apparatus, U.S. Appl. No. 13/723,870, filed Dec. 21, 2012, Seagate Technology LLC, US.

Kief, Final Office Action, Mailing Date: Feb. 6, 2014, Multi-Reader Method and Apparatus, U.S. Appl. No. 13/723,870, filed Dec. 21, 2012, Seagate Technology LLC, US.

Kief, Advisory Action, Mailing Date: May 29, 2014, Multi-Reader Method and Apparatus, U.S. Appl. No. 13/723,870, filed Dec. 21, 2012, Seagate Technology LLC, US.

Kief, Non-Final Office Action, Mailing Date: Sep. 25, 2014, Multi-Reader Method and Apparatus, U.S. Appl. No. 13/723,870, filed Dec. 21, 2012, Seagate Technology LLC, US.

Gibson, Principles of Operation for Shingled Disk Devices, Parallel Dara Laboratory, Carnegie Mellon University, Pittsburgh, PA, Apr. 2011, pp. 1-9.

Zhu, New Heights for Hard Disk Drives, Department of Electrical and Computer Engineering and data Storage Systems Center, Carnegie Mellon University, Pittsburgh, PA, Jul./Aug. 2003, Materials Today, pp. 22-31.

Suzuki, Simultaneous PES Generation, Timing Recovery, and Multi-Track Read on Patterned Media: Concept and Performance, IEEE Transactions on Magnets, vol. 46, Issue 3, Mar. 2010, pp. 825-829.

* cited by examiner

FIG. 10

COMPENSATING FOR INTERFERENCE VIA A MULTI-READER SYSTEM

SUMMARY

In some embodiments, a magnetic storage medium can have data storage tracks, a first read sensor configured to read data from the magnetic storage medium, a second read sensor configured to read data from the magnetic storage medium, and a circuit coupled to the first read sensor and the second read sensor. The circuit can be configured to receive a first read signal from the first read sensor, receive a second read signal from the second read sensor, and operate on the first read signal and the second read signal to produce a compensated read signal. The compensated signal can have less noise than the first read signal and less noise than the second read signal. The circuit can compensate for an expected write signal interference and reader to reader spacing in time.

In some embodiments, a method can include receiving a first read signal from a first read sensor and a second read signal from a second read sensor that is offset from the first read sensor while a write signal in a writer is active, and compensating the first read signal and the second read signal to produce a compensated signal having less noise than the first read signal by utilizing an expected write signal and the offset.

In some embodiments, a system can include a first read sensor and a second read sensor configured to read domains of a data storage medium. The system can further include a circuit coupled to the first and second read sensors configured to receive a first read signal from the first read sensor and a second read signal from the second read sensor. The circuit can further be configured to combine the first read signal and the second read signal to produce a third read signal having less noise than the first read signal.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a hard disc drive. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Data storage devices can have a recording head (i.e. transducer) to write data to, and read data from, a disc medium. In some cases, it may be desirable to read and write data at the same time. For example, the writer may continue to write data to a user data sector even though a reader is reading data from a servo sector. In some cases, an energized writer can generate noise which may be detected by the reader. If the noise is too high, the read data may be unusable. In some cases, the noise may be interference generated by the writer.

Examples are provided herein illustrating a system for compensation for noise interference by combining read signals from two or more read elements to produce a compensated signal without the writer interference. In some embodiments, the systems disclosed herein can be configured to operate in a two dimension magnetic recording ("TDMR") or multi-signal or multi-sensor magnetic recording ("MSMR") system. Further, in certain embodiments, the systems disclosed herein can be configured to operate in a read-while-write mode, wherein read element(s) and a write element are active simultaneously. Even further, in certain embodiments, the systems disclosed herein can be configured to operate in a two dimension magnetic recording device operating in a read while write mode.

Figure 1:
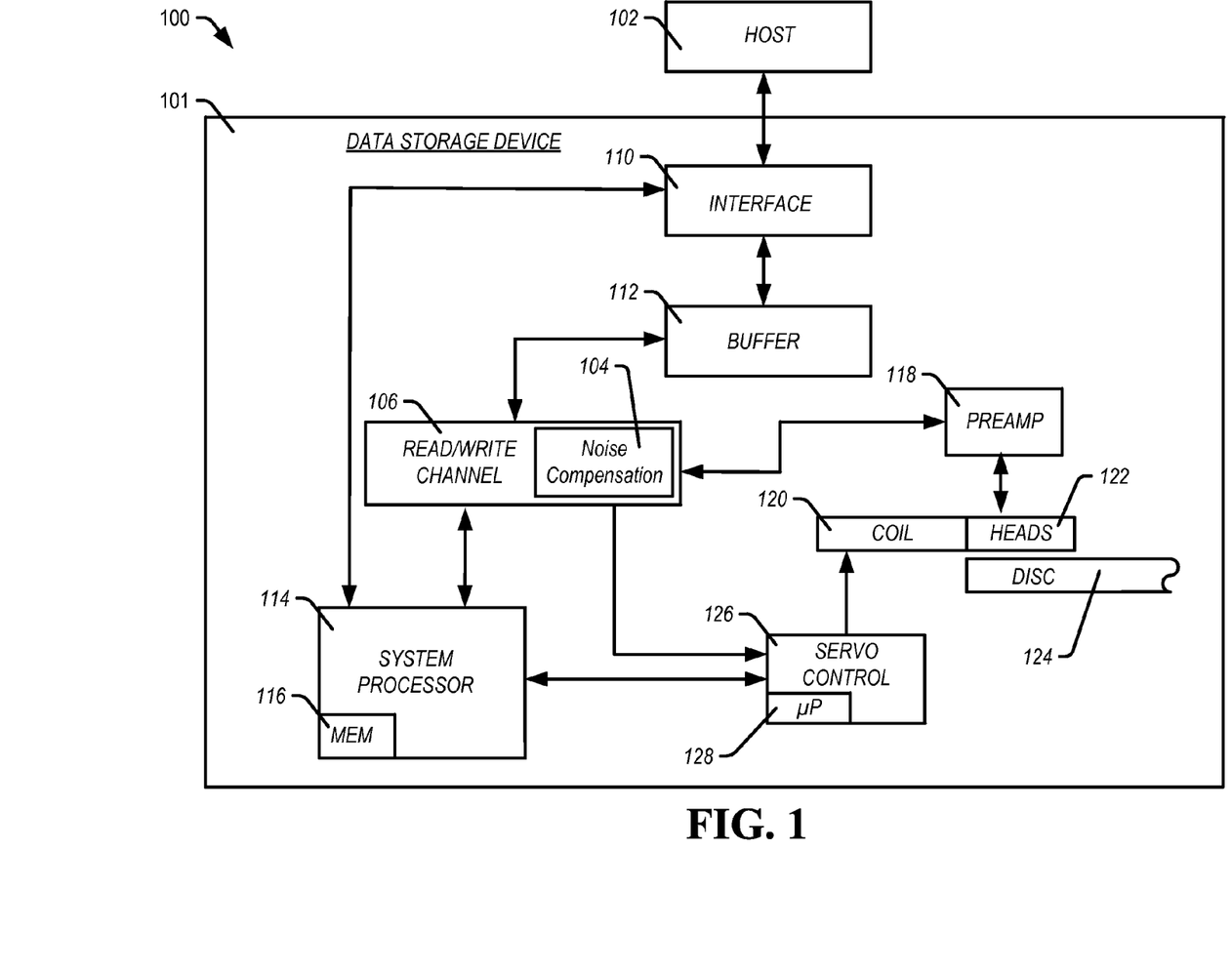
FIG. 1 is a diagram of a system for compensating for interference via a multi-reader system, in accordance with certain embodiments of the present disclosure.

Referring to FIG. 1, certain embodiments of a system of compensating for write interference via a multi-reader system are shown and generally designated 100. Data storage device ("DSD") 101 can optionally connect to be removable from a host device 101, which can be a desktop computer, a laptop computer, a server, a telephone, a music player, another electronic device, or any combination thereof. The DSD 101 can communicate with the host device 102 via the hardware/firmware based host interface circuit 110 that may include a connector that allows the DSD 101 to be physically removed from the host 102.

The DSD 101 can include a system processor 114 and associated memory 116. The system processor 114 may be part of a system on chip (SOC). A buffer 112 can temporarily store data during read and write operations. A preamplifier/driver circuit ("preamp") 118 can apply write currents to the head(s) 122 and can provide pre-amplification of read signals. A servo control circuit 126 may use servo data from a servo sector to provide the appropriate current to the voice coil motor 120 to position the head(s) 122 over disc(s) 124. In some cases, the head(s) 122 may have a write element and multiple reader elements. The controller 106 can communicate with a processor 114 to move the head(s) 122 to the desired locations on the disc(s) 124 during execution of various pending commands or during other operations. As the head(s) 122 write data onto corresponding disc(s) 124, a write element can induce a magnetic flux to change a magnetic polarization to indicate either a one or zero value in magnetic domain(s) of the disc(s) 124. As data is read from the disc(s) 124, a magnetic polarization of one or more magnetic domains is sensed by one or more read elements of a head 122. The read element(s) sense the magnetic fields of the magnetic domains on the disc(s) 124 when the read element(s) pass over the corresponding magnetic domain. Signals generated from sensing the magnetic fields can be amplified, encoded in a read/write channel, and transmitted to a controller or processor to be processed by the DSD 101.

The DSD 101 can include a read/write (R/W) channel 106 which can encode data during write operations and reconstruct user data during read operations. The R/W channel 106 may include a noise compensator circuit 104, although in some cases, the noise compensator circuit 104 may be separate. The noise compensator circuit 104 can compensate for writer noise coupled into reader elements when a writer element and the reader elements are on at the same time. The noise compensation circuit 104 can operate on one or more read signals to produce a compensated read signal, having less noise than the any of the read signals.

Figure 2:
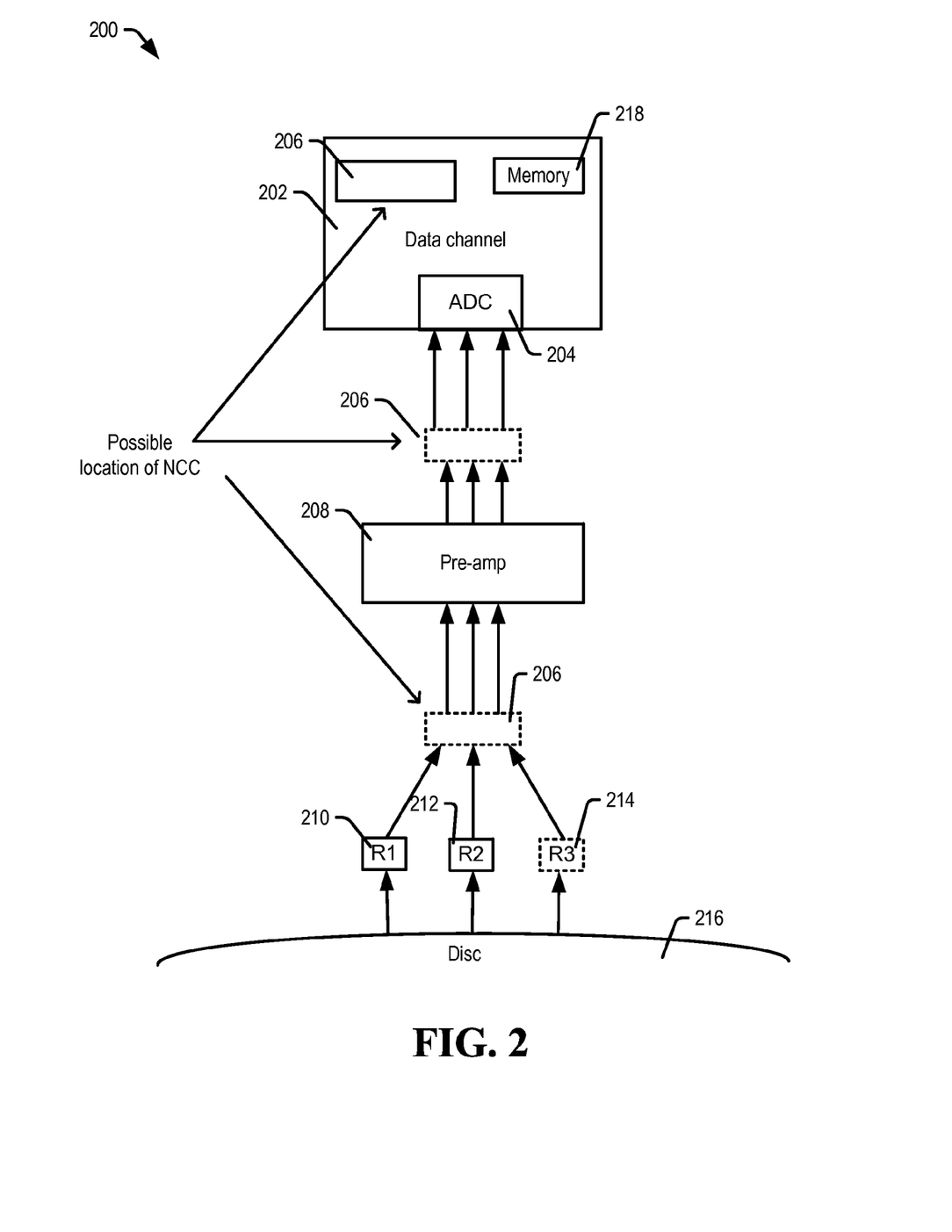
FIG. 2 is a diagram of a system for compensating for interference via a multi-reader system in accordance with certain embodiments of the present disclosure.

Referring to FIG. 2, certain embodiments of a system of compensating for write interference via a multi-reader system are shown and generally designated 200. The system 200 is an example of system 100, in accordance with certain embodiments. The system 200 can include a R/W channel 202, preamp 208, first reader ("R1") 210, second reader ("R2") 212, third reader ("R3") 214 (optional), and disc 218. The R/W channel 202 can include an analog to digital converter ("ADC") 204, memory 218, and noise compensation circuit 206.

In some embodiments, there may be multiple data paths from the read elements 210, 212, 214, to the data channel 202, with a data path corresponding to each read element. In certain embodiments, each data path can include unique inputs and outputs to the pre-amp 208 and the ADC 204, such that each read signal from each of the read elements can be sampled by an ADC.

The noise compensation circuit 206 may be a hardware circuit, such as an application specific integrated circuit, field programmable gate array, or other circuits. In some examples, the noise compensation circuit 206 may be implemented in firmware and executed by a controller circuit. Optionally, in some embodiments, the noise compensation circuit 206 may be located as a separate circuit outside of the R/W channel 202. For example, as shown in FIG. 2, the noise compensation circuit 206 may be located before the pre-amp 208 or between the pre-amp 208 and the R/W channel 202. The data paths necessary for these changes can be adjusted accordingly.

During operation, the disc 216 can store data in magnetic domains via a magnetic field. A value of the data may be determined based on a signal from one or more read elements of a transducer (i.e. R/W head) which can generate a signal based on a sensed direction of polarization of corresponding magnetic fields. For example, readers R1 210, R2 212, and R3 214, can produce electrical signals, which may be referred to as read signals, based on magnetic fields stored in magnetic domains of the disc 216.

In some cases, noise can occur in the read signals generated by the readers. The noise may be due to interference from a writer that is active simultaneously with the writers, or from another source, and may make the electrical signal unreliable or unusable.

In some embodiments, the read signals may be provided to the data channel 202 via the pre-amp 208 (or multiple preamps). The read signals may then be sampled by the ADC 204 (or multiple ADCs), and the resultant sampled data can be stored in the memory 218. The noise compensation circuit 206 can process some or all of the sampled data to generate a compensated signal. The noise compensation circuit 206 can operate on a first read signal and a second read signal (or more read signals) to produce a compensated read signal, having less noise than the first read signal and less noise than the second read signal, by compensating for an expected write signal interference and reader to reader spacing in time.

In some embodiments, the noise compensation circuit 206 may be located between the pre-amp 208 and the readers. The compensation circuit 206 can be configured to filter out noise by combining read signals from multiple reader elements, such as R1 210 and R2 212, and in some cases, R3 214, to produce a single filtered read signal. The resultant filtered read signal may be amplified by the pre-amplifier 208 to produce a single amplified read signal, which may then be input to the data channel 202 for detection and decoding. The data channel 202 may digitize the amplified read signal using the ADC 204. Once the filtered signal has been digitized, it may be processed by the R/W channel 202.

In some embodiments, the noise compensation circuit 206 may be implemented in other locations, such as between the preamp 208 and R/W channel 202, such that the noise compensation circuit 206 can process an amplified read signal from each reader to produce a noise filtered amplified read signal for input to the data channel 202.

Figure 3:
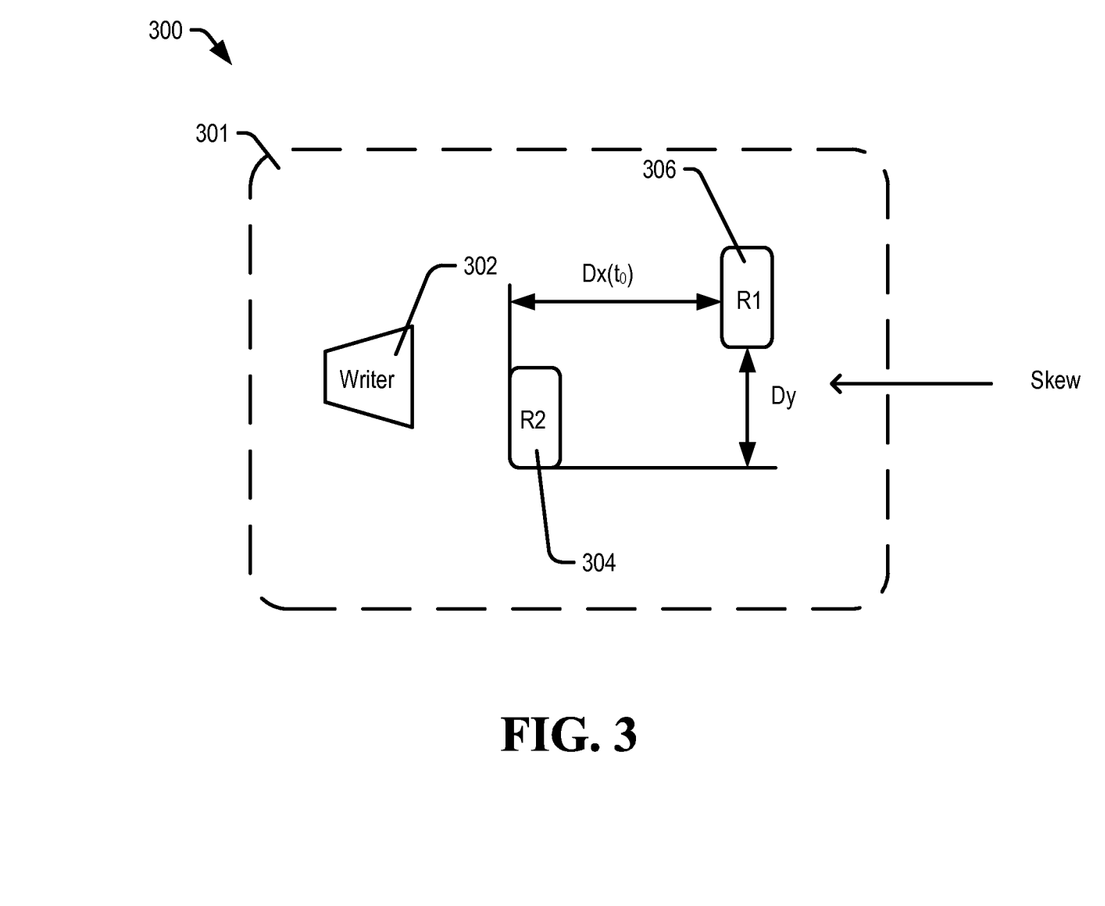
FIG. 3 is a diagram of a system for compensating for interference via a multi-reader system, in accordance with certain embodiments of the present disclosure.

Referring to FIG. 3, certain embodiments of a system of compensating for write interference via a multi-reader system are shown and generally designated 300. The system 300 is an example of system 200, in accordance with certain embodiments. The system 300 can include a recording head 301 (which may also be referred to as an R/W head or a transducer, such as head(s) 122 or 210, 212, or 214) including a writer 302, first reader R1 306, and second reader R2 304. A recording head may include more or less reader elements.

The physical layout of the recording head 301 may be taken into account when using two or more reader elements to produce read signals. For example, R1 306 and R2 304 may be skewed by a distance Dy, and offset by a distance Dx. In some cases, Dx is a physical distance between R1 306 and R2 304, and can correspond to a time lag, $t_0$, between R1 306 and R2 304. Time lag, $t_0$, can represent the delay in time between the corresponding read signals as they read a selected magnetic domain. The time lag, $t_0$, may be referred to as a time offset or a reader to reader spacing in time. The magnitude of $t_0$ may be based on a length of Dx and a rotational speed of the disc. In some cases, $t_0$ can be determined based on a difference in times at which a sync mark is found with the two readers. A geometry of a recording head and disc drive can also be used to estimate a down track separation between the two readers, once the separation ($x_0$) is known at zero skew. At any other skew angle, theta, the down track separation can be estimated as $x_0$ cos (theta). In some cases, $t_0$ may be determined before a write begins or during settling time of a seek process.

Figure 4:
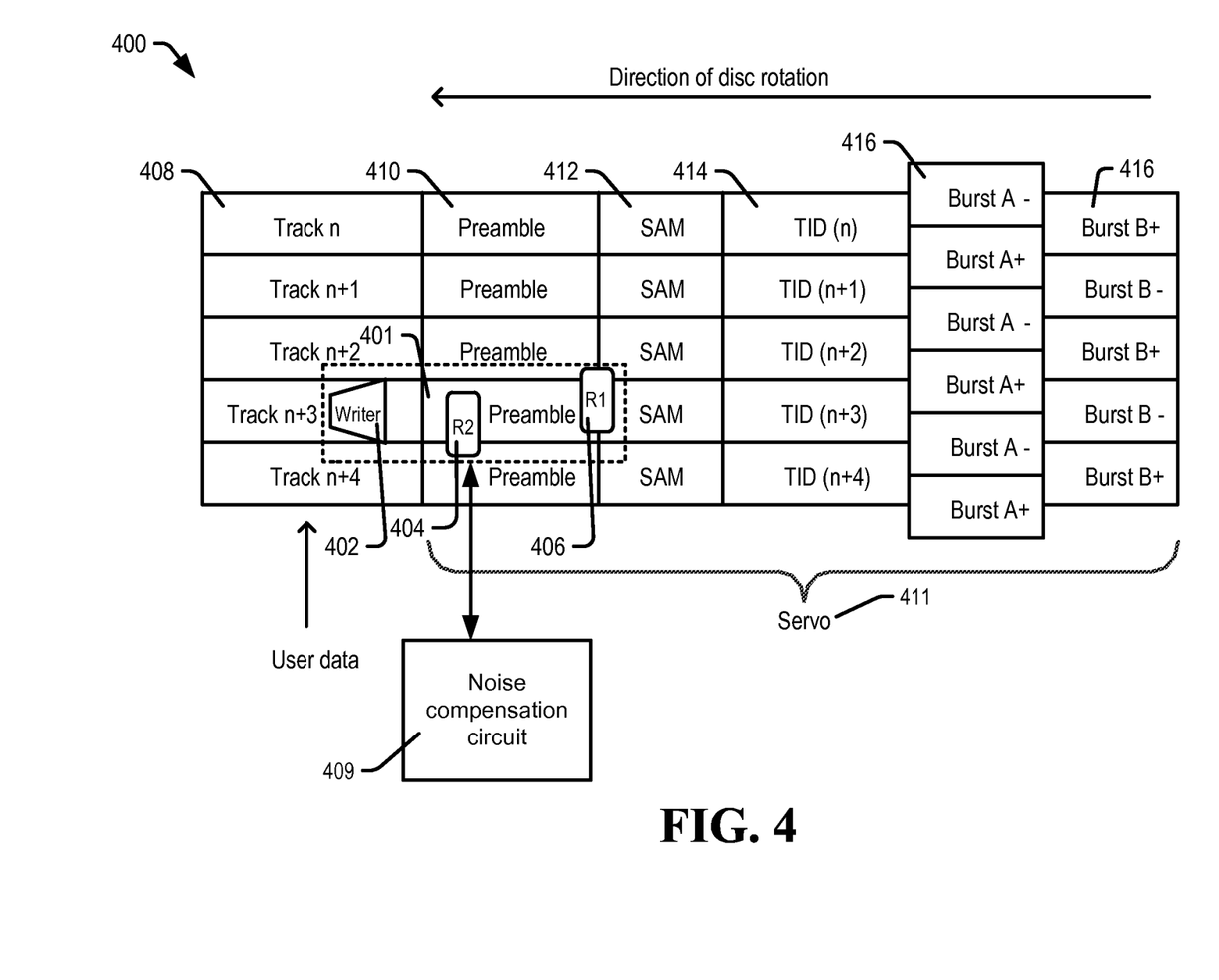
FIG. 4 is a diagram of a system for compensating for interference via a multi-reader system, in accordance with certain embodiments of the present disclosure.

Referring to FIG. 4, certain embodiments of a system of compensating for write interference via a multi-reader system are shown and generally designated 400. The system 400 is an example of system 300, in accordance with certain embodiments. The system 400 can include recording head 401, user data tracks 408 on a disc, noise compensation circuit 409, and servo field 411. The recording head 401 may be the recording head 301, head(s) 122 or head with elements 210, 212, or 214, and can include a writer 402, and two or more reader elements, such as reader R1 406, and reader R2 404.

In some cases, the servo field 411 may provide position information of recording head to a controller. The servo field 411 can have a preamble 410, servo address marker ("SAM") 412, track identification 414, and burst data 416. The preamble 410 can enable an R/W channel and disc to synchronize timing and phase values in order to demodulate information in the servo sector 411. The SAM 412 may confirm a reader is over a servo pattern, and that a timing of the servo field is correct. Also, the SAM 412 may confirm a position of the servo field. In some embodiments, the track identification ("TID") 414 may identify each track. The burst data 416 may be fractional information (e.g. track-to-track displacement of a recording head 401 with respect to selected track centerline).

During operation, a disc may rotate under the recording head 402, which may be actuated between an inner diameter and outer diameter of a corresponding disc to access different tracks at different radial positions of the disc. At some point in time, the writer 402 may be over a user data portion of a track (e.g. track n+3) 408, and R1 406 and R 2 404 may be over the servo field 411 of the same track. When the writer 402 is writing data to the user data portion, the write signal could cause noise that may interfere with the reader signals from R1 406 and R2 404.

Some systems address the issue of writer noise interfering with read signals by placing a gap (sometimes referred to as a servo gap) between a user data sector and a servo sector. The gap may be a region on a disc where no data is stored. In some cases, the width of the gap may be at least as wide as the distance from a writer to a leading edge of a reader, thus allowing the writer to finish writing (and turn off) before the reader is over the servo sector.

In some embodiments, noise in the read signals may be removed by the noise compensation circuit 409. The noise compensation circuit 409 can be configured to produce a compensated read signal (i.e. read signal without the noise or with reduced noise), and to provide the compensated read signal to an R/W channel for processing. Since the compensation circuit 409 can remove the noise in the read signals, the width of a servo gap may be greatly reduce, or the servo gap may be eliminated.

Figure 5:
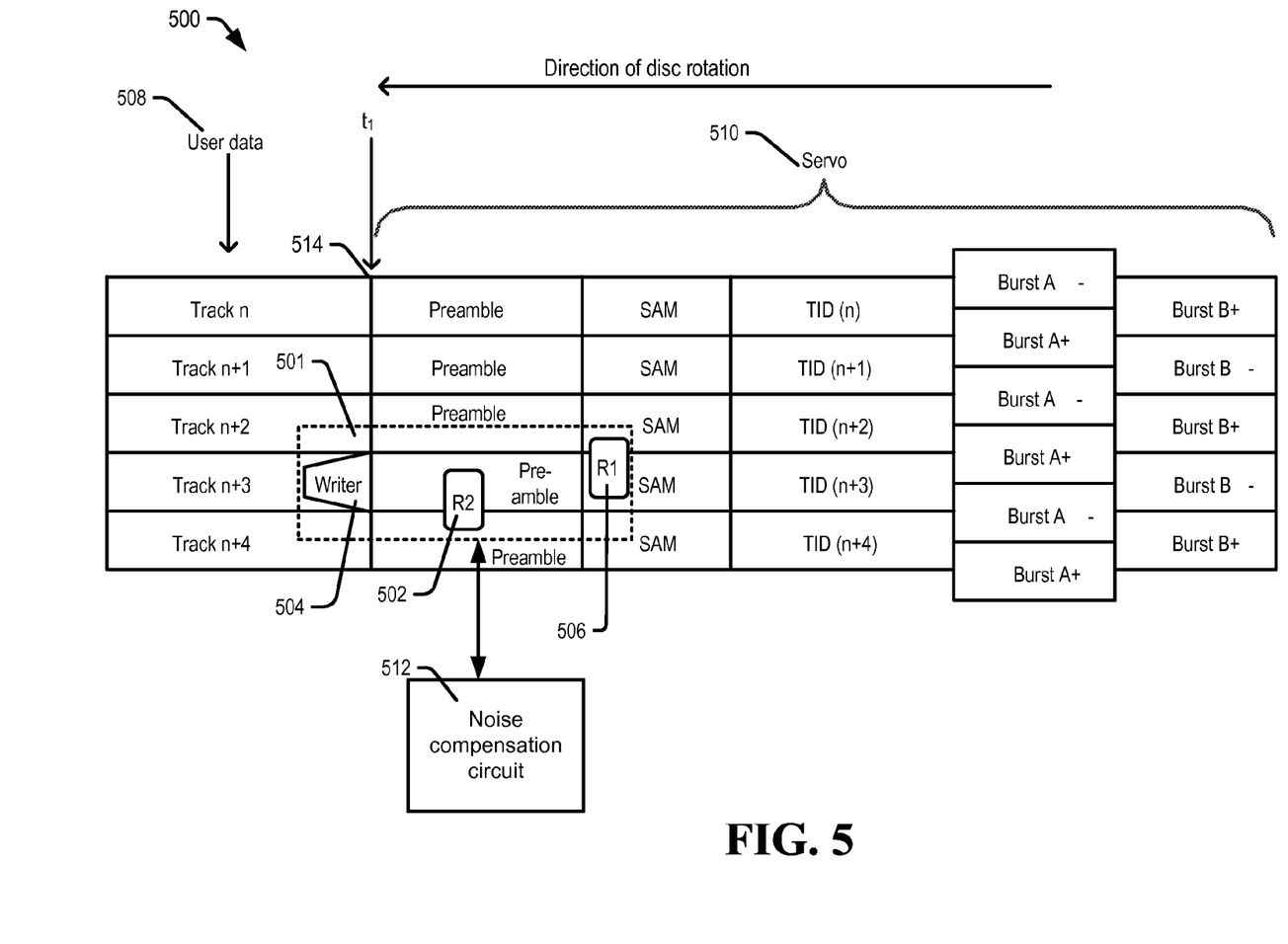
FIG. 5 is a diagram of a system for compensating for interference via a multi-reader system, in accordance with certain embodiments of the present disclosure.

Referring to FIG. 5, certain embodiments of a system of compensating for write interference via a multi-reader system are shown and generally designated 500. The system 500 is an example of system 400, in accordance with certain embodiments. The system 500 can include recording head 501, user data sector 508 on a disc, servo sector 510 on a disc, and noise compensation circuit 512. The recording head 501 can have head(s) 122 or head with elements 210, 212, or 214, a writer 502, and two or more reader elements, such as R2 502, and R1 506, and can be coupled to the noise compensation circuit 512.

In some cases, the writer 504 may be energized, and may switch from an energized state to a non-energized state once it passes from the user data sector 508 to the servo sector 510, at time $t_1$ 514. In some examples, the writer 504 may be turned on or off by a data channel. The writer 504 may be turned off over the servo sector 510 to prevent servo data from being overwritten. The writer 504 may be turned on after the servo sector 510 to store data to a user data sector. When both the writer 504 and readers R2 or R1 506 are on at the same time, noise from the writer 504 may couple onto the read signals of R1 506 and R2 502, and can cause the read signals to be unreliable.

The noise compensation circuit 512 can process the read signals to filter out the noise and generate a compensated read signal. The compensated read signal may be the reader signal with reduced or no writer noise.

In some embodiments, the noise compensation circuit 512 can generate a compensation signal based on a predicted interference of the write signal. The predicted interference of the write signal may be based on an expected write signal and reader to reader spacing, which may be a time offset, a physical offset, or both (see FIG. 6). For example, a predicted shape and amplitude of a drive current of a write signal may be used to generate a compensation signal that may be combined with the read signals to produce a compensated read signal.

For example, a cancellation filter circuit may be implemented in a read channel to receive the write signal and produce an estimate of a write signal interference (i.e. predicted interference) that can be combined with the read signal(s) to reduce or remove noise from the read signal(s). The predicted interference could be combined with each of the read signals prior to processing the read signals, or could be combined with the compensated read signal after the read signals have been processed. Other examples are provided in U.S. patent application Ser. No. 14/050,447, entitled "Read Read-Only Fields While Writing", filed on Oct. 10, 2013, and commonly owned by the Applicant at the time of filing of this Application.

Figure 6:
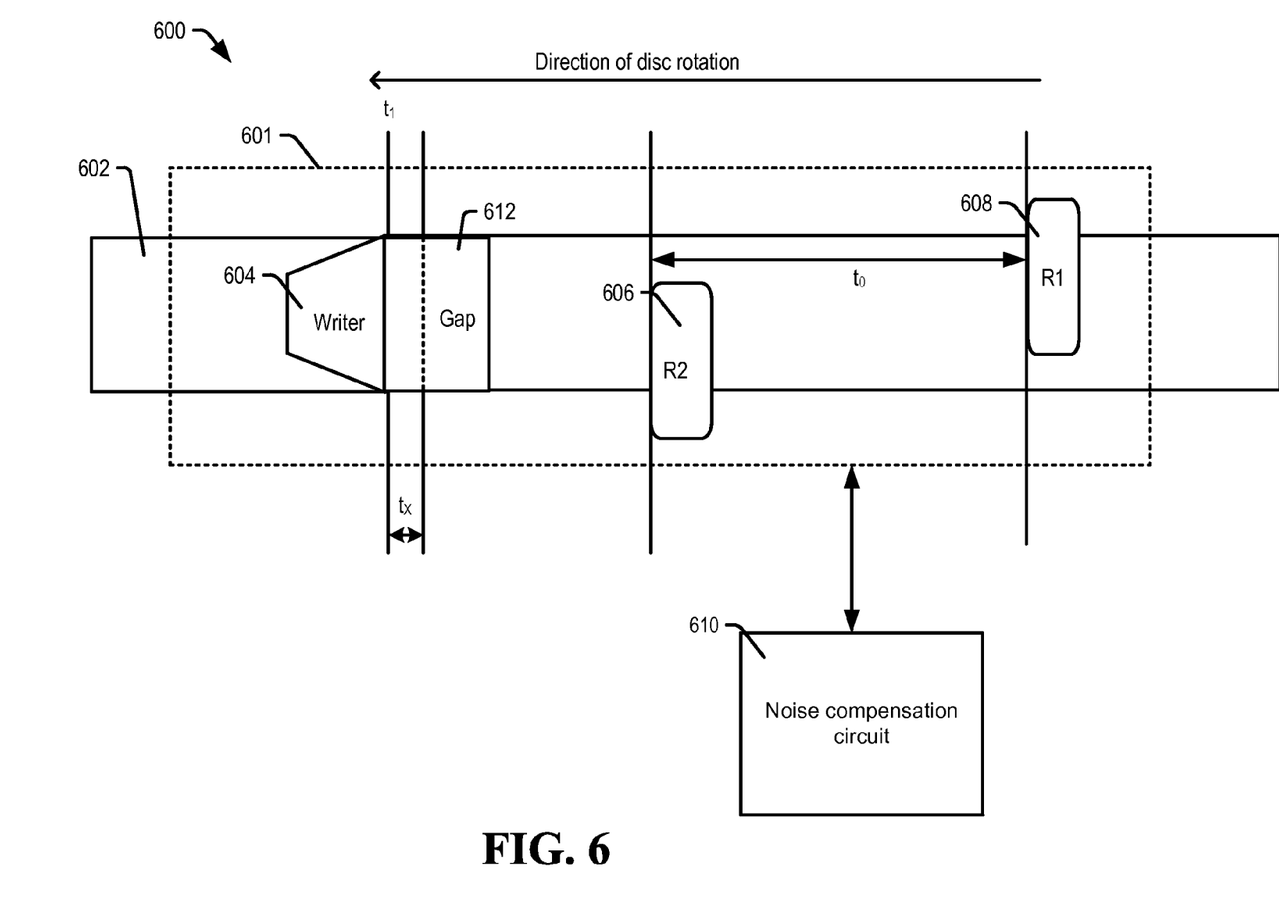
FIG. 6 is a diagram of a system for compensating for interference via a multi-reader system, in accordance with certain embodiments of the present disclosure.

Referring to FIG. 6, certain embodiments of a system of compensating for write interference via a multi-reader system are shown and generally designated 600. The system 600 is an example of system 500, in accordance with certain embodiments. System 600 can include a gap 612, recording head 601, track 602 on a disc, and noise compensation circuit 610. The recording head 601 can include head(s) 122 or head with elements 210, 212, or 214, a writer 604, and two or more reader elements such as a first reader R1 608, and second reader R2 606. In some cases, the gap 612 may be a servo gap, an inter-sector gap, or other gap.

During operation, the track 602 can rotate under the recording head 601. R1 may reach a location of the track 602 before R2 606, and the writer 604. Locations of the track 602 can include the gap 612 between a user data sector and a servo sector, or other locations. As the track 602 rotates, an amount of time elapses between when R1 608 reaches a specific location on the track 602 and R2 606 reaches the same location, which time lag can be referred to as $t_0$.

The writer 604 can transition between energized and de-energized states at time $t_1$. In some cases, $t_1$ may occur as the writer 604 passes over a specific location, such the gap 612 between a user data sector and a servo sector. In some examples, the writer 604 may not de-energize immediately after receiving a power off command. For example, the writer 604 may require a certain amount of time to degauss. In some cases, magnetic writers can be degaussed to remove an unwanted magnetic field. The period of time between when the writer 604 receives a command to power off and when degauss is complete can be referred to as $t_x$. In some embodiments, $t_x$ may be a period of time between when the writer 604 receives a power off command and when the writer is de-energized below a threshold level.

Two examples are shown demonstrating how the noise compensation circuit 610 can remove a noise component(s) from a read signal to produce a compensated read signal. In the first example, the writer 604 is powered down at time $t_1$. In the second example, the writer 604 is powered up at time $t_1$.

Example 1

Writer Powered Down (i.e. Power Off or De-Energized to a Level to that Cannot Perform Operations) at $t_1$ $$R_2(t_1+t_x+t_0)=D_S(t_1+t_x) \quad (1)$$

$$R_1(t_1+t_x)=D_S(t_1+t_x)+W_S(t_1+t_x) \quad (2)$$

$$R_2(t_1+t_x)=D_S(t_1+t_x-t_0)+W_S(t_1+t_x) \quad (3)$$

where $D_S$ is the portion of the read signal without the noise component, and $W_S$ is the noise from the writer.

Equations (1), (2), and (3) can be combined (1−2+3) to calculate $D_S$ at time $t=(t_1+t_x-t_0)$ In some embodiments, the noise compensation circuit 610 can determine $D_S$ prior to $t=t_1+t_x$. For example, to determine $D_S(t_1+t_x-t_0)$:

$$R_1(t_1+t_x-t_0)=D_S(t_1+t_x-t_0)+W_S(t_1+t_x-t_0) \quad (4)$$

$$R_2(t_1+t_x-t_0)=D_S(t_1+t_x-2t_0)+W_S(t_1+t_x-t_0) \quad (5)$$

Equations 1, 2, 3, 4, and 5 can be combined ((1−2+3)−4+5) to calculate $D_S$ at $t=(t_1+t_x-2t_0)$. Note that the previous equations may be used before the writer is turned off if the writer is in a constant state.

Example 2

Writer Powered Up (i.e. Power on or Energized to a Level to Perform Operations) at $t_1$ $$R_1(t_1-t_0)=D_S(t_1-t_0) \quad (6)$$

$$R_1(t_1)=D_S(t_1)+W_S(t_1) \quad (7)$$

$$R_2(t_1)=D_S(t_1-t_0)+W_S(t_1) \quad (8)$$

Equations (1), (2), and (3) can be combined (1+2−3) to calculate $D_S$ at time $(t)=(t_1)$ In some embodiments, the noise compensation circuit 610 can determine $D_S$ after $t=t_1$.

For example, to determine $D_S(t_1+t_0)$:

$$R_1(t_1+t_0)=D_S(t_1+t_0)+W_S(t_1+t_0) \quad (9)$$

$$R_2(t_1)=D_S(t_1)+W_S(t_1-t_0) \quad (10)$$

Equations 6, 7, 8, 9, and 10 can be combined ((6−7+8)+9−10) to calculate $D_S$ at $t=(t_1+t_0)$.

Note that a time delay can be incorporated into the above equations.

It should be understood that the operations previously discussed are for illustrative purposes. There may be more operations or different operations. Further, the operations can be adapted to be compatible with three or more readers. All of the operations and equations discussed in this application can be implemented via firmware, field programmable gate arrays, application specific integrated circuits, or other circuits. For example, these equations can be implemented using adder circuits, multiplier circuits, subtraction circuits, or any combination thereof.

Figure 7A:
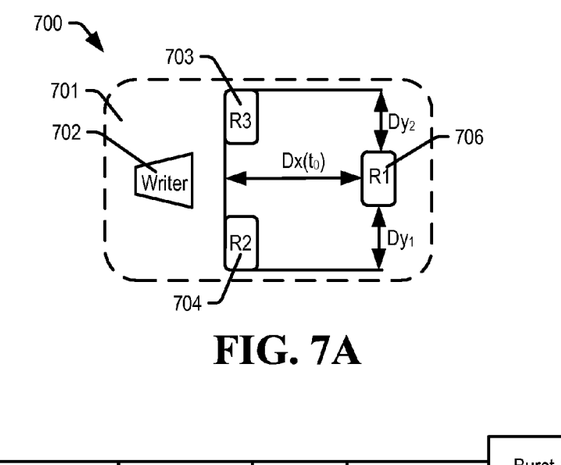
FIG. 7A and FIG. 7B are diagrams of a system for compensating for interference via a multi-reader system, in accordance with certain embodiments of the present disclosure.

Referring to FIG. 7A, certain embodiments of a system of compensating for write interference via a multi-reader system are shown and generally designated 700. The system 700 is an example of system 600, in accordance with certain embodiments. System 700 can include FIG. 7A and FIG. 7B. FIG. 7A can include a recording head 701 The recording head can include head(s) 122 or head with elements 210, 212, or 214, a writer 702, and a reader array including multiple readers, such as R1 706, R2 704, and R3 703. In some cases, readers R2 704 and R3 703 may both be distance Dx and time lag $t_0$ from R1 706; R3 703 may be skewed by $Dy_1$ from R1 706, and R2 704 may be skewed by $Dy_2$ from R1 706. In some instances $Dy_1$ and $Dy_2$ may have the same magnitude.

Figure 7B:
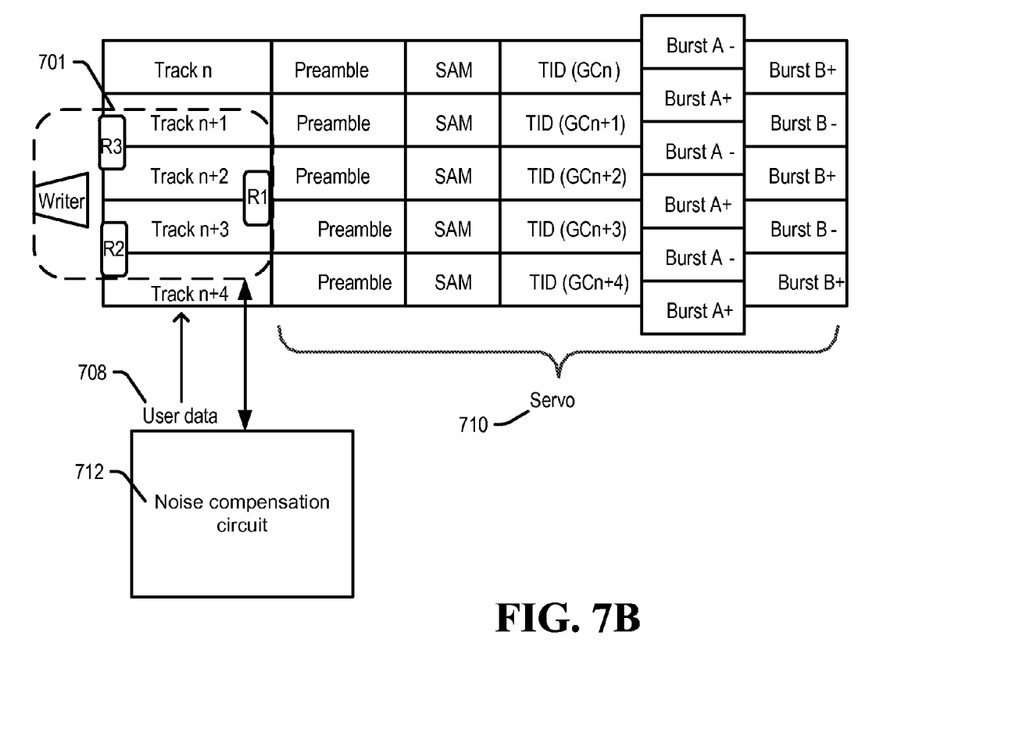

FIG. 7B can include user data portions of tracks 708, servo field 710, noise compensation circuit 710, and recording head 701.

During operation, the noise compensation circuit 710 may reduce or eliminate writer noise from a read signal by combining read signals from R1 706, and at least one of R2 704, or R3 703. In some embodiments, the noise compensation circuit 710 may determine whether to use a read signal from R2 704 or R3 703 based on skew. For example, if $Dy_1$ is less than $Dy_2$, the noise compensation circuit 710 may generate a compensated signal based on read data from R1 706, and R2 704. In some case, $Dy_1$ and $Dy_2$ may change based on where the recording head is positioned over a disc.

In some embodiments, the noise compensation circuit 710 may select a read signal from R2 704 or R3 703 based on which reader has a stronger signal, proximity, or on performance characteristics (e.g. whether one is more sensitive or less noisy). In some embodiments, the read signals from all three readers may be used to filter out noise. In some examples, the selection of read signals can be selected and changed on-the-fly, in real-time.

Figure 8:
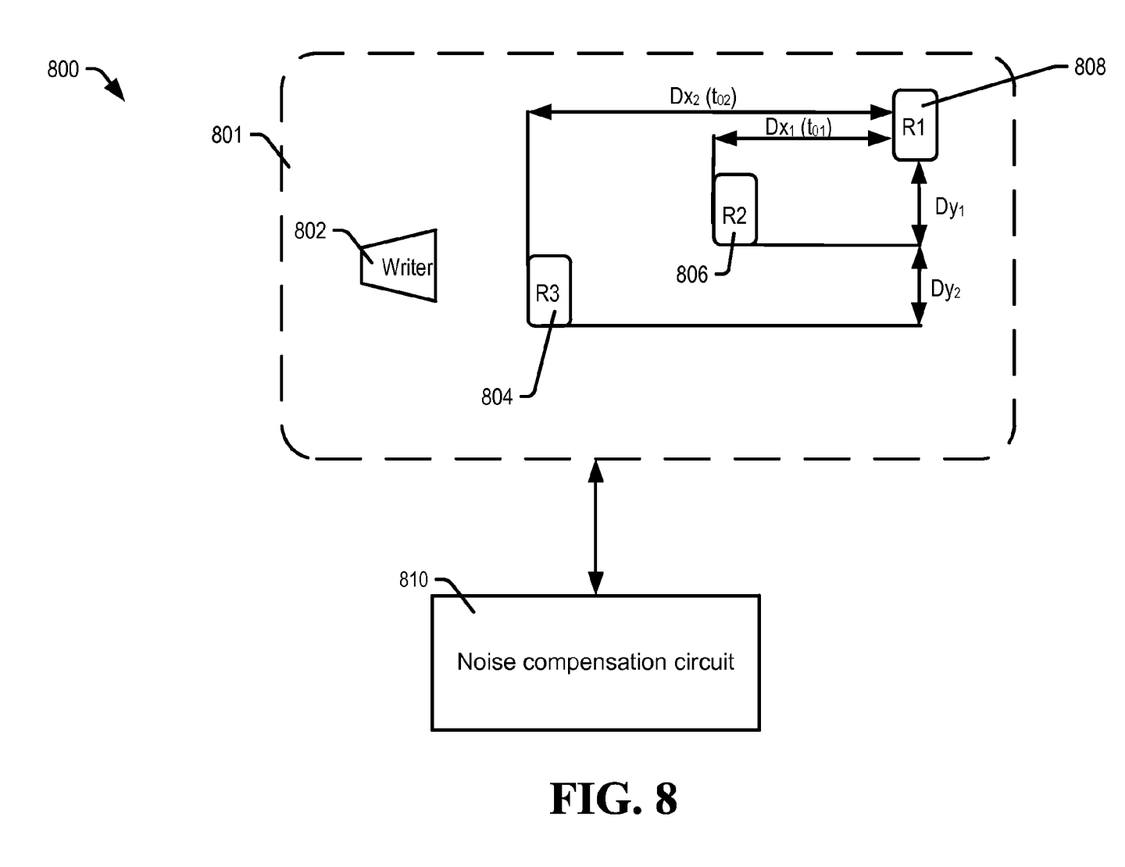
FIG. 8 is a diagram of a system for compensating for interference via a multi-reader system, in accordance with certain embodiments of the present disclosure.

Referring to FIG. 8, certain embodiments of a system for compensating for write interference via a multi-reader system are shown and generally designated 800. The system 800 is an example of system 600, in accordance with certain embodiments. The system 800 can include a recording head 801 and noise compensation circuit 810. The recording head 801 can include head(s) 122 or head with elements 210, 212, or 214, a writer 802, and a reader array including multiple reader elements, such as a first reader R1 808, a second reader R2 806, and a third reader R3 804.

On some examples, the readers R1 808 and R2 806 may be separated by a distance of $Dx_1$, and have a time lag of $t_{01}$. The readers R1 808 and R3 804 may be separated by a distance of $Dx_2$, and have a time lag of $t_{02}$. R2 806 may have a skew of $Dy_1$ with respect to R1 808, and R3 803 may have a skew of $Dy_2$ with respect to R1 808.

During operation, the noise compensation circuit can generate a compensated read signal based on reads signals from R1 808 and at least one of R2 806 and R3 804. In some embodiments, any reader can be a lead reader. In some cases, the lead reader can lag a second reader. The selection of the lead reader and second reader may be based on which combination would result in faster compensation calculations, and may change based on a location of the recording head 801 with respect to the disc.

Figure 9:
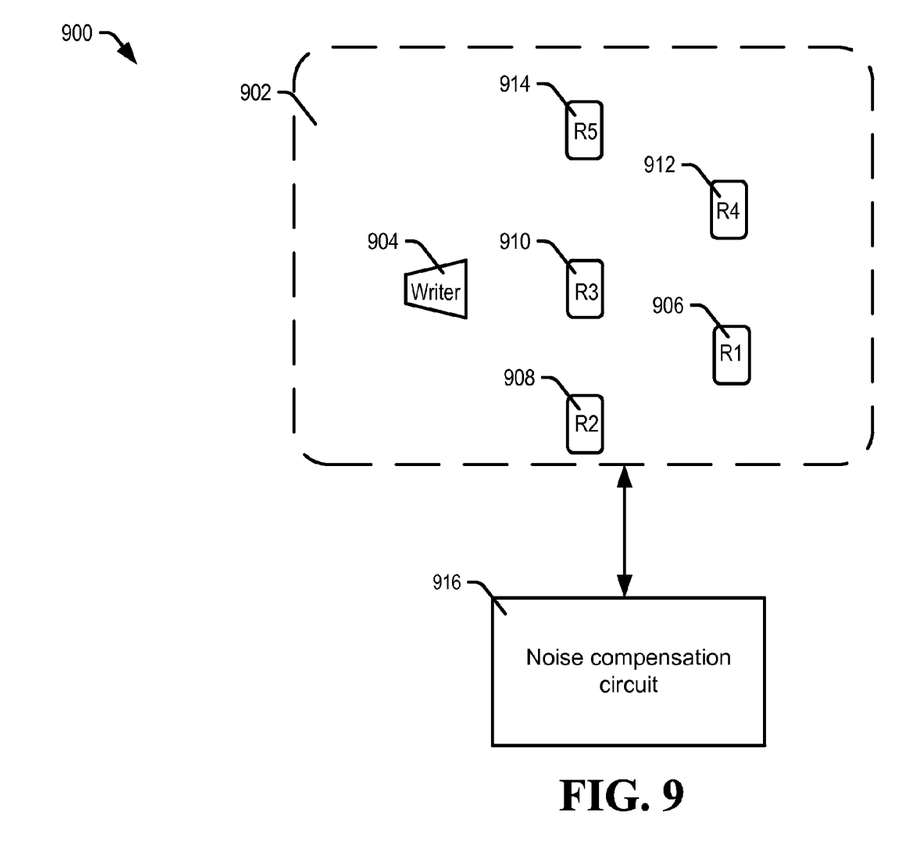
FIG. 9 is a diagram of a system for compensating for interference via a multi-reader system, in accordance with certain embodiments of the present disclosure.

Referring to FIG. 9, certain embodiments of a system for compensating for write interference via a multi-reader system are shown and generally designated 900. The system 900 is an example of system 600, in accordance with certain embodiments. The system 900 can include a recording head 902. The recording head 902 can include head(s) 122 or head with elements 210, 212, or 214, writer 904, and multiple reader arrays. The multiple reader arrays can include a first reader R1 906, second reader R2 908, third reader R3 910, fourth reader R4 912, and fifth reader R5 914. The system 900 may further include a noise compensation circuit 916 coupled to the recording head 902.

In some embodiments, the noise compensation circuit 916 may be configured to filter writer noise from recordings heads having multiple reader arrays. In some embodiments, a reader array may include a forward reader element and at least one rear reader element. In some cases, one reader array can read data from a single track. Recording heads having multiple reader arrays can be configured to read data from two or more tracks simultaneously.

Figure 10:
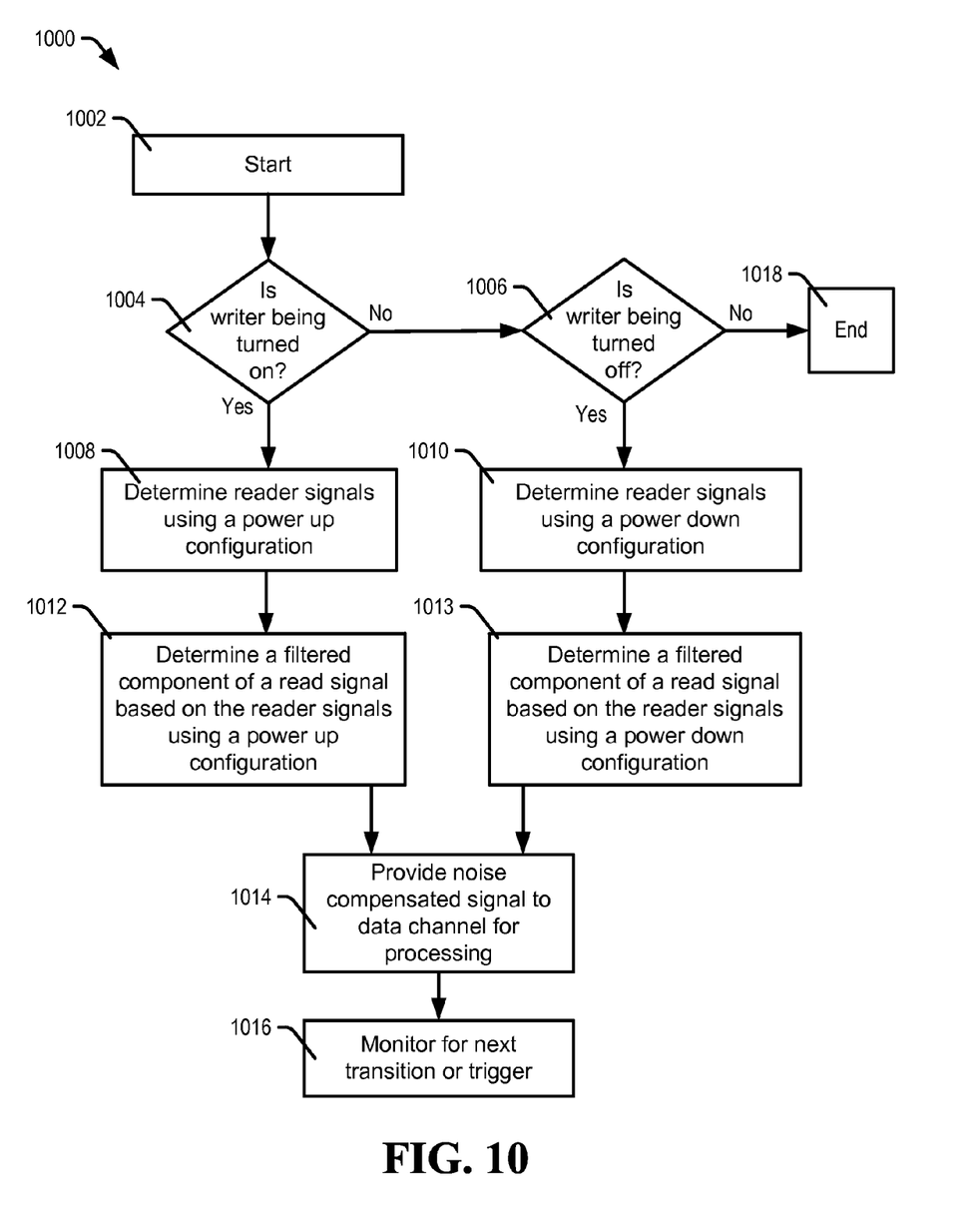
FIG. 10 is a flowchart of a method for compensating for interference via a multi-reader system, in accordance with certain embodiments of the present disclosure.

Referring to FIG. 10, a flowchart of a method of compensating for write interference via a multi-reader system is shown and generally designated 1000. The system 1000 is an example implementation of system 600, in accordance with certain embodiments. The method 1000 can generate a compensated read signal based on read signals from multiple readers.

The method 1000 can start at 1002. In some cases, the method 1000 may start when a command is received or a trigger is detected. For example, a trigger may be detected when a reader or writer passes over a certain location, such as a servo gate ("sgate"), which can be an indicator stored in a track prior to a servo field that indicates the writer is to be turned off prior to a servo field. In some examples, a trigger may occur when a timer expires, an amplitude of a read back signal changes, or when the reader or writer passes over a safety gate, sequential gate, or other gate or marker on the disc.

The method 1000 can include determining if a writer is being turned on, at 1004. When the writer is being turned on, the method 1000 can include determining read signals for each reader (e.g. R1, R2) using a power up configuration, at 1008, and determining a filtered component of a read signal based on the read signals using a power up configuration, at 1012.

When the writer is not being turned on, the method 1000 can include determining if the writer is being turned off, at 1006. When the writer is not being turned off, the method 1000 can end, at 1018, which may allow the read and write signals to be filtered and processed accordingly. When the writer is being turned off, the method 1000 can include determining read signals for each reader using a power down configuration, at 1010, and determining a filtered component of a read signal based on the read signals using a powered down configuration, at 1013. In some examples, the method 1000 can include determining reader signals even if the writer is not transitioning states. For example, the method 1000 can determine reader signals when a timer has expired, or upon detection of another trigger.

In some examples, the power up configuration referred to in operations 1008 and 1012 may be example one ("Writer powered up at $t_1$") of system 600, and the power down configuration referred to in operations 1010 and 1013 may be example two ("Writer powered down at $t_1$").

The method 1000 can provide the filtered component of the read signal to a data channel for processing, at 1014. The method 1000 can monitor for next transition or trigger, at 1016.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. For example, the systems described herein can be applied to any type of data storage medium in which a read element must follow a data track, such as an optical data storage medium or a magneto-optical data storage medium. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
   a first read sensor and a second read sensor configured to read domains of a data storage medium, the first read sensor having an offset from the second read sensor;
   a circuit coupled to the first and second read sensors configured to:
   receive a first read signal from the first read sensor and a second read signal from the second read sensor; and
   combine the first read signal and the second read signal to produce a third read signal having less noise than the first read signal, the third read signal based on an expected write signal and the offset.

2. The system of claim 1 further comprising:
   the circuit configured to generate a compensation signal based on a predicted profile of the noise, and combine the predicted profile of the noise with the third read signal to produce a fourth read signal having less noise than the third read signal.

3. The system of claim 1 further comprising:
   a writer with an offset from the first read sensor and the second read sensor, the writer configured to write data to the data storage medium.

4. The system of claim 3 further comprising:
   the writer configured to transition from an energized state to a de-energized state upon receiving a command to de-energize;
   the circuit configured to generate the third read signal based on the first read signal at time $t_1+t_x$, the first read signal at time $t_1+t_x+t_0$, and the second read signal at time $t_1+t_x$, where
   $t_1$ is a point in time at which the writer detects an indicator;
   $t_0$ is a time offset the between the first read signal and the second read signal as the first read signal and the second read signal read a selected magnetic domain; and
   $t_x$ is a time offset between when the writer receives the command to de-energize and when the writer is de-energized below a threshold level.

5. The system of claim 4 further comprising:
   the circuit configured to generate the third read signal for any time prior to time $t_1+t_x$ when the writer transitions from an energized state to a de-energized state.

6. The system of claim 3 further comprising:
the writer configured to transition from a de-energized state to an energized upon state detection of an indicator;
the circuit configured to generate the third read signal based on the first read signal at time $t_1$, the second read signal at time $t_1$, and the second read signal at time $t_1-t_0$;
$t_1$ is a point in time at which the writer detects the indicator; and
$t_0$ is a time offset the between the first read signal and the second read signal as the first signal and the second signal read a selected magnetic domain.

7. The system of claim 6 further comprising:
the circuit configured to generate the third read signal for any time after time $t_1$ when the writer transitions from a de-energized state to an energized state.

8. The system of claim 1 further comprising:
the circuit configured to provide the third read signal to a data channel configured to decode the third read signal.

9. The system of claim 1 wherein the first and second read sensors and the circuit are configured to operate in a two dimension magnetic recording device while operating in a read while write mode.

10. An apparatus comprising:
a magnetic storage medium having data storage tracks;
a first read sensor configured to read data from the magnetic storage medium;
a second read sensor configured to read data from the magnetic storage medium;
a circuit coupled to the first read sensor and the second read sensor, the circuit configured to:
  receive a first read signal from the first read sensor;
  receive a second read signal from the second read sensor; and
  operate on the first read signal and the second read signal to produce a compensated read signal, having less noise than the first read signal and less noise than the second read signal, by compensating for an expected write signal interference and reader to reader spacing in time.

11. The apparatus of claim 10 further comprising:
the circuit configured to receive a third read signal from a third sensor and operate on the first read signal, the second read signal and the third read signal to produce a compensated read signal having less noise than the first, second, and third read signals.

12. The apparatus of claim 11 further comprising:
the circuit configured to selectively utilize the second read signal and the third read signal based on which of the second read sensor and a third read sensor has a smaller skew value with respect to the first read sensor.

13. The apparatus of claim 12 further comprising:
the circuit configured to selectively utilize the second read signal and the third read signal based on which of the second read sensor and a third read sensor has a lower noise component.

14. The apparatus of claim 13 further comprising:
the circuit configured to generate another compensated signal for another track when another reader is generating a read signal based on data from the another track.

15. A method comprising:
receiving, while a write signal in a writer is active, a first read signal from a first read sensor and a second read signal from a second read sensor that has an offset from the first read sensor; and
compensating the first read signal and the second read signal to produce a compensated signal having less noise than the first read signal by utilizing an expected write signal and the offset.

16. The method of claim 15 further comprising:
determining a read signal where the first read signal and the second read signal are each at least a portion of the read signal at different times;
determining a noise component of the writer; and
determining the compensated signal based on the portions of the read signal at the different times and the noise component of the writer, wherein the compensated signal is a portion of the read signal without the noise component.

17. The method of claim 15 further comprising:
selectively utilizing the first read signal, the second read signal, and a third read signal from a third read sensor to determine the compensated signal based on which combination of read signals would result in a faster calculation of the compensated signal as compared to other possible combinations of read signals.

18. The method of claim 15 further comprising:
determining when the writer is powering up or powering down; and
selectively implementing power operations based on when the writer is powering up or powering down.

19. The method of claim 18 further comprising:
when the writer is powering up, the power operations include:

$$R_1(t_1-t_0)=D_S(t_1-t_0);$$

$$R_1(t_1)=D_S(t_1)+W_S(t_1);$$

$$R_2(t_1)=D_S(t_1-t_0)+W_S(t_1);$$

where $R_1$ is the first read signal, $R_2$ is the second read signal;
$t_1$ is a point in time at which the writer is energized;
$t_0$ is a time offset the between the first read signal and the second read signal as the first read signal and the second read signal read a selected magnetic domain;
$W_S$ is the noise; and
$D_S$ is the compensated signal.

20. The method of claim 18 further comprising:
when the writer is powering down, the power operations include:

$$R_2(t_1+t_x+t_0)=D_S(t_1+t_x);$$

$$R_1(t_1+t_x)=D_S(t_1+t_x)+W_S(t_1+t_x);$$

$$R_2(t_1+t_x)=D_S(t_1+t_x-t_0)+W_S(t_1+t_x);$$

where $R_1$ is the first read signal, $R_2$ is the second read signal;
$t_1$ is a point in time at which the writer receives a command to de-energize;
$t_0$ is a time offset the between the first read signal and the second read signal as the first read signal and the second read signal read a selected magnetic domain;
$W_S$ is the noise;
$D_S$ is the compensated signal; and
$t_x$ is a time offset between when the writer receives the command to de-energize and when the writer is de-energized below a threshold level.

* * * * *